No. 691,738. Patented Jan. 28, 1902.
E. G. ASHLEY.
GEAR CUTTER.
(Application filed Mar. 21, 1898.)
(No Model.) 5 Sheets—Sheet 1.
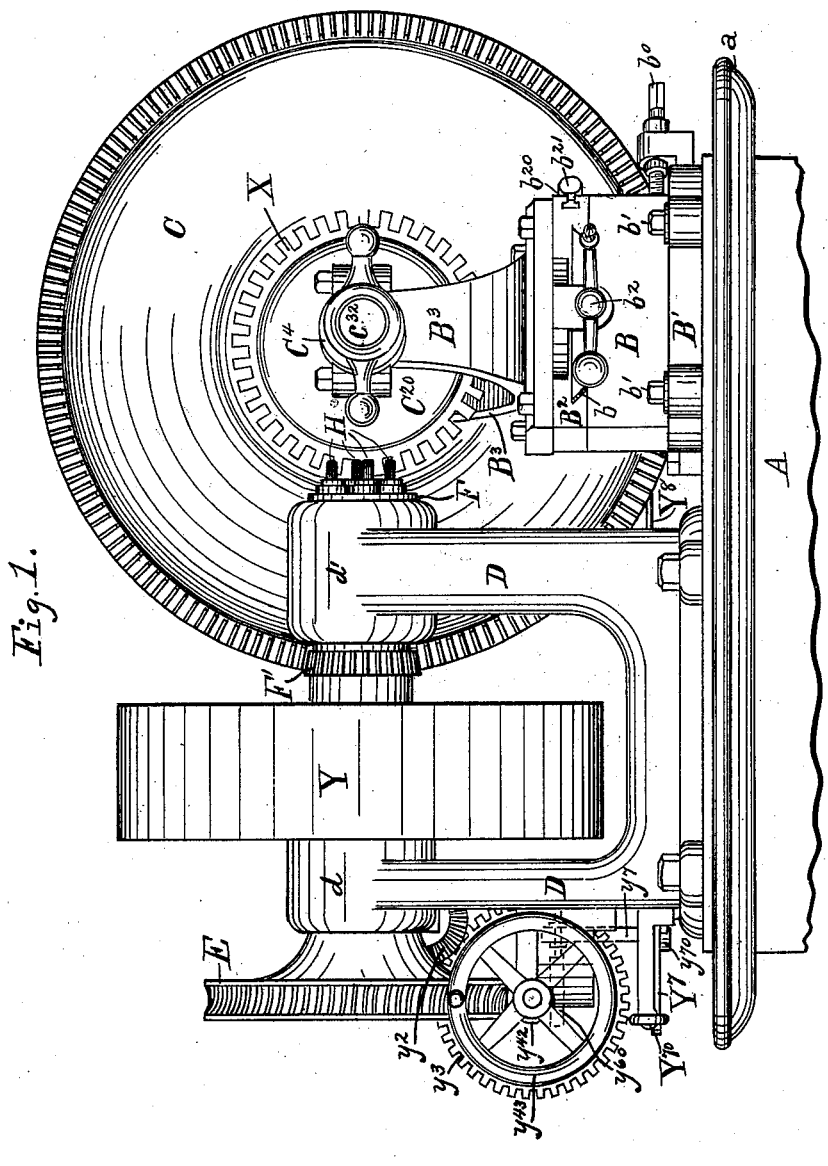
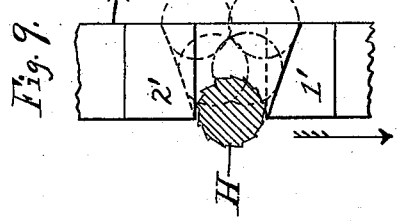
Witnesses. Inventor.
Sadie Coryell. Edward G. Ashley
F. Bissell. by
Attorneys

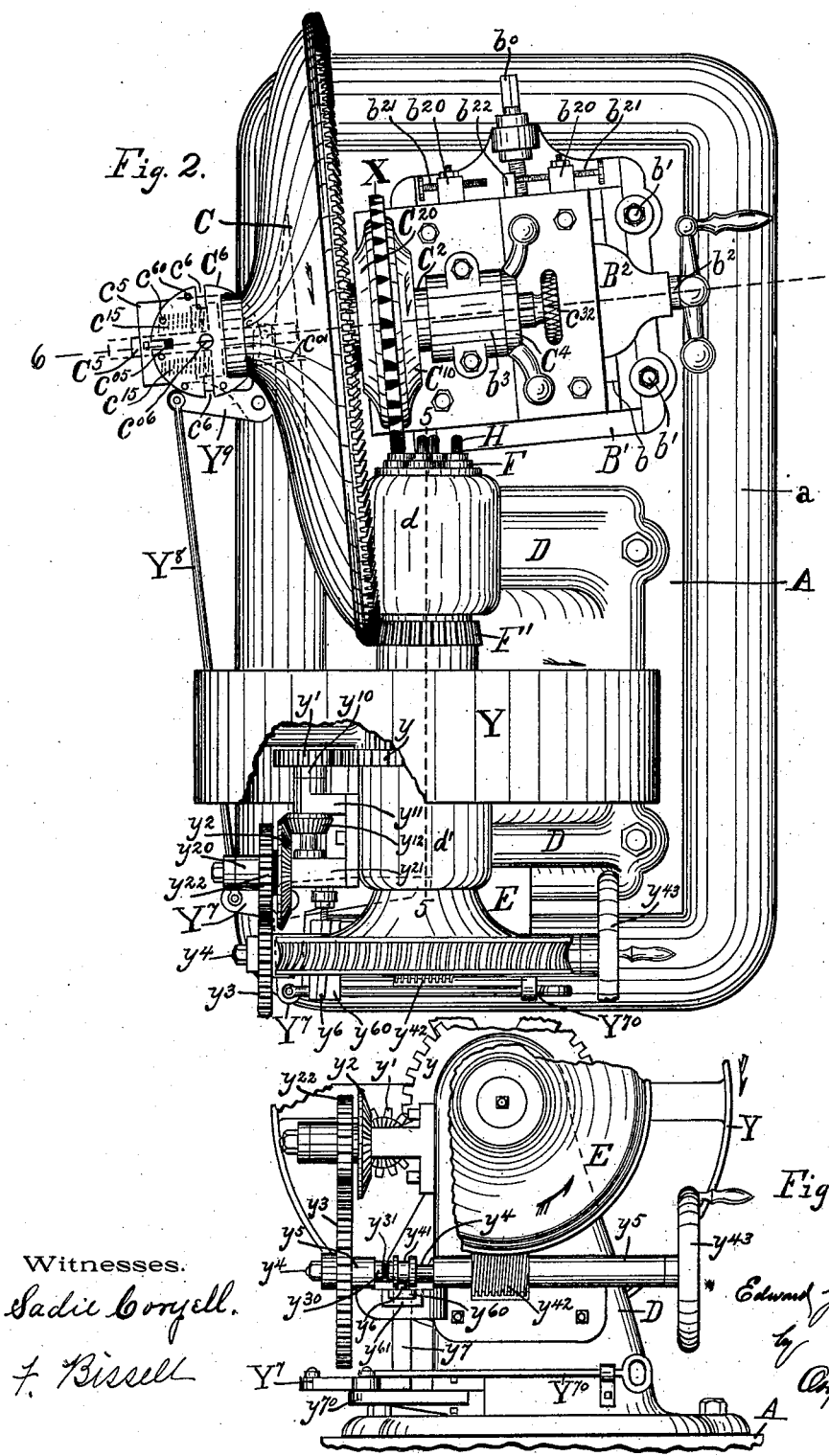

No. 691,738. Patented Jan. 28, 1902.
E. G. ASHLEY.
GEAR CUTTER.
(Application filed Mar. 21, 1898.)
(No Model.) 5 Sheets—Sheet 3.
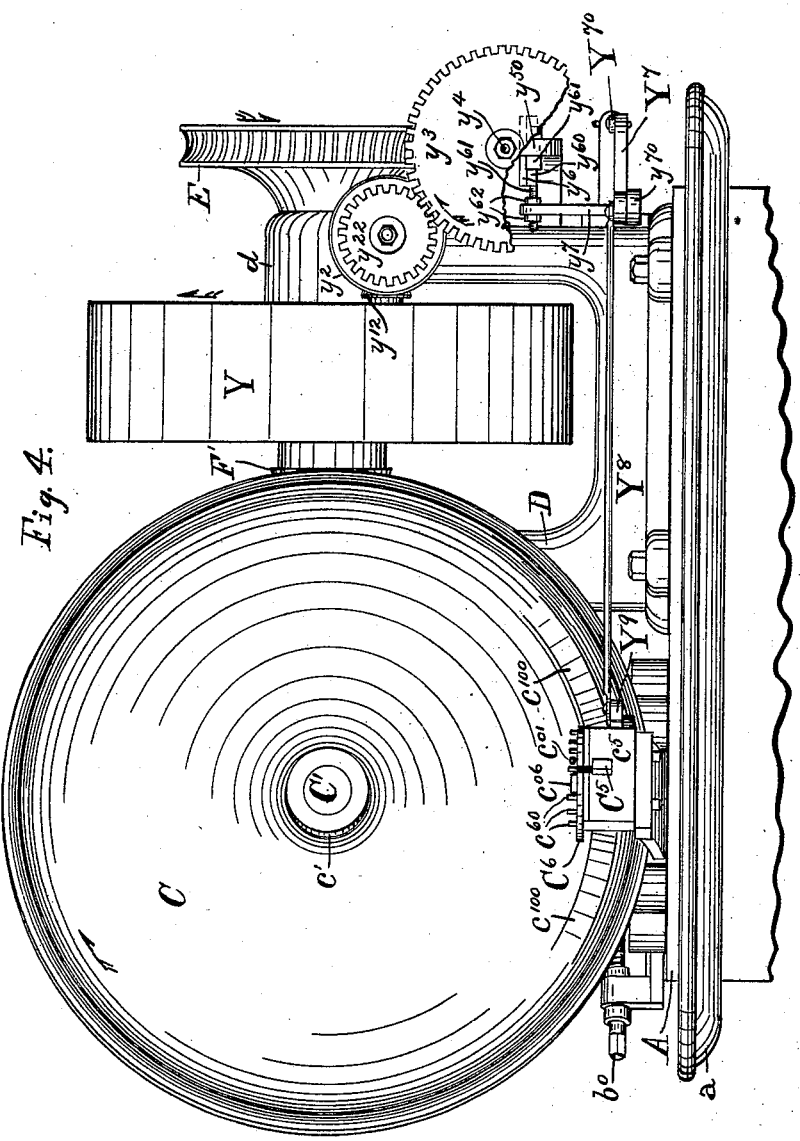
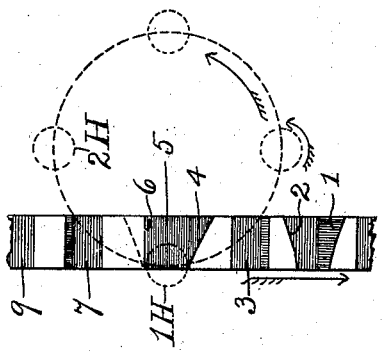
Witnesses.
Sadie Coryell.
F. Bissell
Inventor.
Edward G. Ashley
by
Osgood & Davis
Attorneys

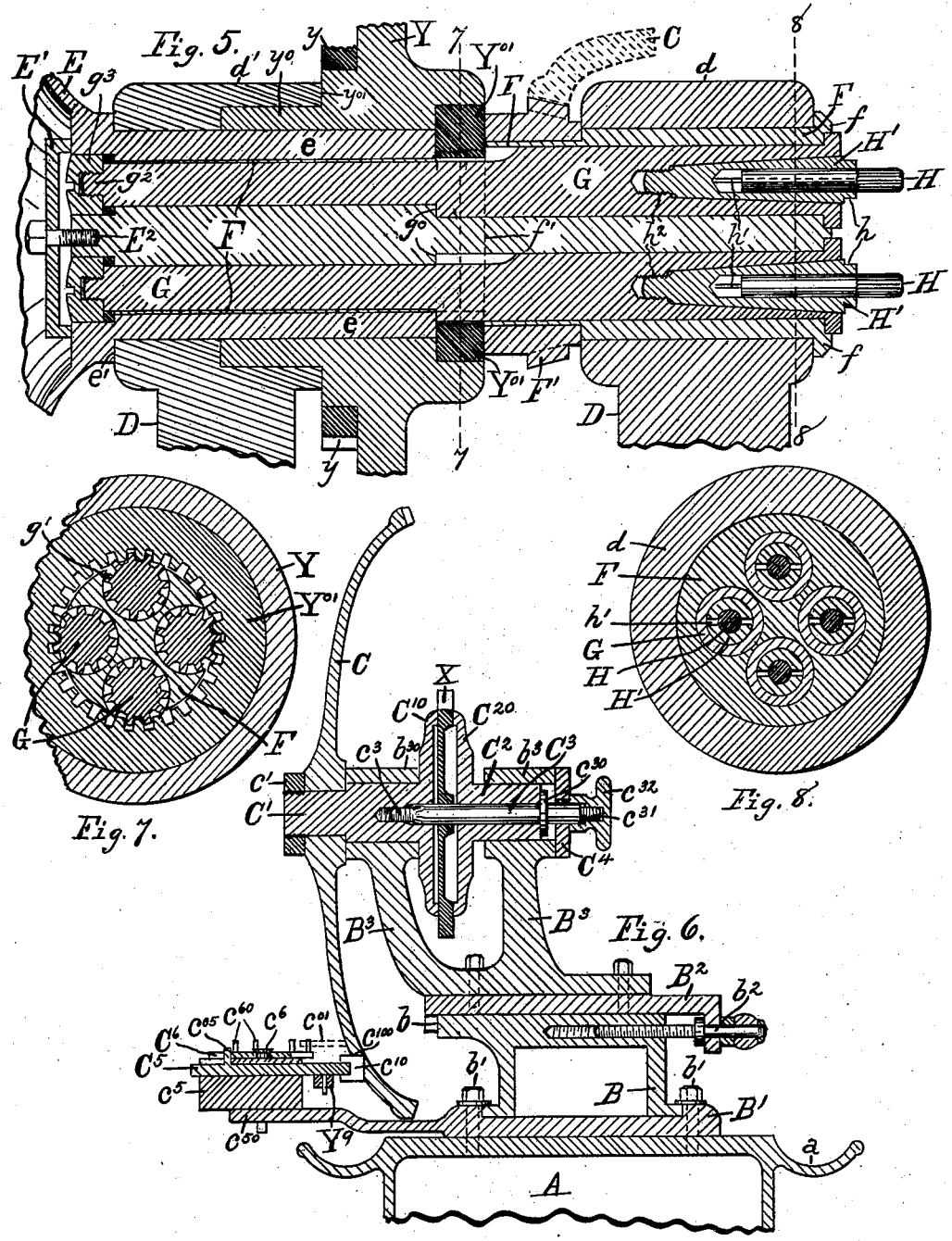

No. 691,738. Patented Jan. 28, 1902.
E. G. ASHLEY.
GEAR CUTTER.
(Application filed Mar. 21, 1898.)
(No Model.) 5 Sheets—Sheet 5.
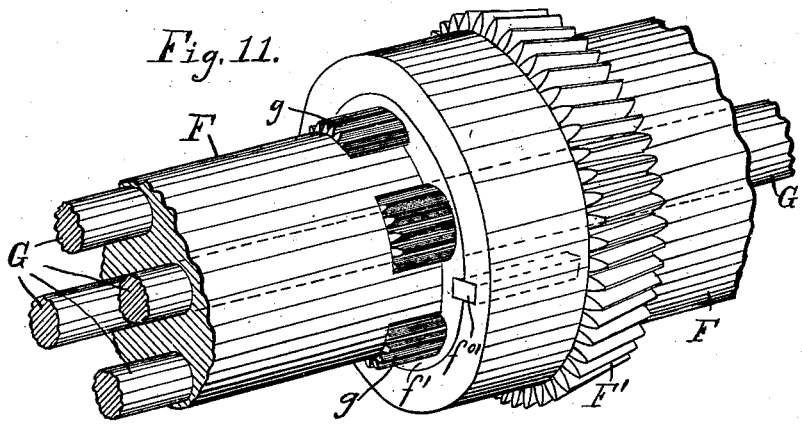
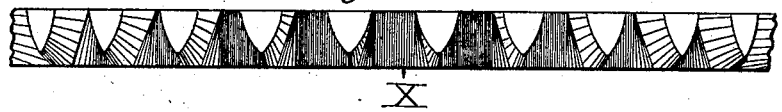
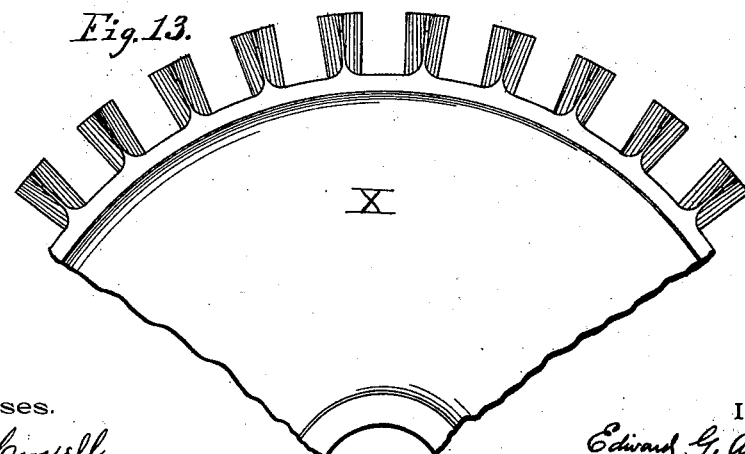
Witnesses.
Sadie Coryell.
F. Bissell.
Inventor:
Edward G. Ashley
by Ogmf & Davis
Attorneys.

UNITED STATES PATENT OFFICE.

EDWARD G. ASHLEY, OF ROCHESTER, NEW YORK, ASSIGNOR, BY MESNE ASSIGNMENTS, TO SAGER GEAR COMPANY.

GEAR-CUTTER.

SPECIFICATION forming part of Letters Patent No. 691,738, dated January 28, 1902.

Application filed March 21, 1898. Serial No. 674,659. (No model.)

*To all whom it may concern:*

Be it known that I, EDWARD G. ASHLEY, a citizen of the United States, and a resident of Rochester, in the county of Monroe and State of New York, have invented certain new and useful Improvements in Gear-Cutters, of which the following is a specification.

This invention relates to gear-cutting machines, and particularly to machines of that class which are intended to produce cut gears for coöperation with pin-gears.

My invention consists in the devices, arrangements, and combinations herein set forth and claimed.

In the drawings, Figure 1 is a front view of my machine. Fig. 2 is a top plan view thereof. Fig. 3 is an end view thereof. Fig. 4 is a rear view thereof. In Figs. 2, 3, and 4 parts are broken away to exhibit interior constructions. Fig. 5 is a central vertical section on the line 5 5 of Fig. 2. Fig. 6 is a vertical section on the line 6 6 of Fig. 2. Figs. 7 and 8 are sections on the lines 7 7 and 8 8 of Fig. 5. Figs. 9 and 10 are diagrams to illustrate the operation of the machine. Fig. 11 is an isometric view of a portion of the cutter-head. Fig. 12 is a view of a portion of the periphery of an angle-gear cut with my machine, and Fig. 13 is a face view of a portion of the same angle-gear.

This machine is intended to cut gears embodying the invention of James H. Sager, as set forth in his application for United States Patent filed December 30, 1897, Serial No. 664,693. For this purpose I provide a chuck for holding a blank of suitable size, means for revolving the chuck, a cutter-head carrying a single milling-cutter with its axis eccentric to the axis of the cutter-head or a series of cutters, each cutter corresponding in form to one or more of the pins upon a pin-gear adapted to mesh with the cut gear, and each cutter being set at a distance from the axis of the cutter-head equal to the distance of the pin of a pin-gear from the axis of rotation of said gear, means for revolving the cutters, and a connection between the chuck and the cutter-head whereby the two revolve together with uniform ratio of velocity.

Supplementary to the mechanism just mentioned I provide means for adjusting the position of the chuck in any horizontal direction with reference to the cutter-head, and thus to determine the angle at which the cut gear is to operate with its pin-gear, and also the depth of the cut, both toward the center of the blank and with reference to its side faces. I also provide means for stopping the machine automatically when the cutting of the blank has been finished, together with other adjustments and arrangements hereinafter to be particularly described.

In the drawings, A is a table for supporting the machine, which may be surrounded, as shown in the drawings, by the oil-trough $a$, so that the oil that is freely used upon the cutters when operating upon the work may, as usual in such machines, be collected to be used again. Upon the table A and near one end is the chuck-support, which comprises a pair of cross-slides, the lower of which, B, slides substantially longitudinally with reference to the table A in guides upon the base B', which is set upon said table. Bolts $b'$ serve to clamp the slide B upon the base-plate B'. This slide is adapted to adjust the chuck to and from the cutter-head. On the slide B are guides $b$, which engage in corresponding recesses in the upper slide-plate $B^2$ and which are arranged to permit movement of the upper plate $B^2$ transversely with reference to the line of movement of the lower plate B. A suitable screw $b^2$ serves to move and adjust the slide-plate $B^2$ with reference to the lower slide-plate B, which constitutes its base. These parts are substantially the same as the ordinary slide-rest of a lathe and need no particular description.

The lower slide-plate B may be moved by a screw $b^0$ for adjustment with reference to the base-plate B'. Upon the lower slide B are lugs $b^{20}$, through which adjusting-screws $b^{21}$ pass and which form adjustable stops for the lug $b^{22}$ upon the upper slide-plate $B^2$, so that said upper slide-plate when operated by the handle $b^2$ may be moved within definite limits in order that a series of blanks successively placed in the chuck may be uniformly cut. Upon the plate $B^2$ a chuck is supported in a suitable frame $B^3$, which is fixed upon said plate $B^2$. This frame on one side carries a driving gear-wheel C, which is fastened upon a shaft C' in any suitable way, as by a set-nut $c'$. The shaft C' passes through a bearing $b^{30}$ upon the frame $B^3$ and bears a chuck-plate $C^{10}$. In line with the shaft $C'$ is a shaft $C^2$ in a bearing $b^3$ upon the frame $B^3$. The shaft $C^2$ on its inner end bears a chuck-plate $C^{20}$, corresponding and opposite to the chuck-plate $C^{10}$. Through the center of the shaft $C^2$ passes the clamping-rod $C^3$, which is screw-threaded on its end, as at $c^3$, in order to engage a threaded recess in the inner end of the shaft $C'$. The rod $C^3$ has a collar $c^{30}$, which presses upon the outer end of the shaft $C^2$, and when the rod is screwed into the shaft $C'$ the two chuck-plates $C^{10}$ and $C^{20}$ are forced together. In order to operate the rod $C^3$, I provide a collar $C^4$, having a suitable handle $c^4$, and this collar is splined to the rod $C^3$, so that rotation of the collar causes rotation of the shaft and permits longitudinal movement of the shaft with reference to the collar. The outer end of the rod $C^3$ is threaded, as at $c^{31}$, and a set-nut $c^{32}$ upon the rod serves to fasten the rod with reference to the collar $C^4$. The collar $C^4$ rests against the outer end of the bearing $b^3$ and by means of the set-nut $c^{32}$ may be adjusted to press with such friction as may be desired upon the end of the bearing. The clamping of the chuck-plates $C^{10}$ and $C^{20}$ is, however, accomplished independently of the frictional pressure of the collar $C^4$ upon the bearing $b^3$.

The blank X, which is to be cut, is formed of suitable diameter to permit the portion out of which the teeth are to be formed to extend outside of the edges of the chuck-plates $C^{10}$ and $C^{20}$ and has a suitable central perforation through which the rod $C^3$ may pass. In order to center the blank properly, the perforation through the blank should fit the rod $C^3$. On turning the collar $C^4$ in the proper direction the rod $C^3$ is unscrewed from the shaft $C'$, and the rod may be drawn out far enough to release the blank X from the rod and to permit it to be removed from between the chuck-plates $C^{10}$ and $C^{20}$, whereupon the parts are in position to receive a new blank. From the construction of the parts it will be seen that chuck-plates of different sizes may be placed in the machine in order to clamp blanks of different diameters, and the wheel C may be replaced by another of different pitch or diameter, or both, as may be desired. I find that it is preferable to use chuck-plates which support the blank as near as possible to the portion to be cut.

As hereinafter described, the driving mechanism and the cutters H are adjusted in the form of my invention shown herein to cut the spaces between alternate pairs of teeth and to cut both sides of each tooth on two complete revolutions of the chuck. I therefore provide half as many equidistant cutters as there are to be pins on the pin-gear with which the gear cut in my machine is to mesh. This arrangement is provided so as to give better opportunity for firmly supporting the cutters and their driving mechanisms and to reduce to the minimum the work thrown at any one time upon the set of cutters. In some cases, however, it would be entirely practicable to employ the same number of cutters as pins in the pin-gear which is to be used. I provide also means whereby in the machine shown at the end of two revolutions of the chuck the driving-wheel C is stopped and locked in place and the power is disconnected from the mechanism; but this may obviously be modified to stop the machine at any desired point whether the revolution of the chuck is partial or complete or its revolutions are of any selected number.

Upon the back of the driving-wheel is a socket $c^{10}$, Fig. 6, formed, for instance, in a suitable rib $c^{100}$ upon said wheel. In this socket engages a spring-bolt $C^5$, which moves in a suitable guideway in a block $c^5$, supported upon a bracket $c^{50}$ behind the driving-wheel C. Springs $c^{15}$, connected to said bolt and to said block $c^5$, tend to pull the bolt $C^5$ toward the wheel C. A pin $c^{05}$ extends upwardly from the bolt $C^5$ and through a slot provided for its movement. Upon the upper surface of the block $c^5$ is a cam-plate $C^6$, provided with a series of notches $c^6$. When the pin $c^{05}$ rests upon the periphery of the plate $C^6$, the bolt $C^5$ is held back, so that it cannot enter the notch $c^{10}$ on the wheel C, and when a notch $c^6$ registers with the position of the pin $c^{05}$ the pin is pulled into the notch by the springs $c^{15}$, and the bolt $C^5$ may enter the notch $c^{10}$. In order that one of the notches $c^6$ may register with the position of the pin $c^{05}$ upon every alternate revolution of the wheel C, I provide a pin or lug $c^{0'}$ upon the back of the wheel C. The plate $C^6$ is revoluble upon the axis $c^{06}$, and from the upper surface of the plate $C^6$ extends a series of pins $c^{60}$, two such pins being placed between each two adjacent notches $c^6$. When the wheel C revolves, the pin $c^{0'}$ engages one of the pins $c^{60}$ and moves the plate $C^6$ from a position of registry of the pin $c^{05}$ with a notch $c^6$, such as is shown in Figs. 2 and 6, to a position intermediate between the position just mentioned and the position of the next registry of the pin with a notch. Upon a second revolution of the wheel C the pin $c^{0'}$ engages the next pin $c^{60}$ and completes the movement of the cam-plate $C^6$ to the position of registry of a notch $c^6$ with the pin $c^{05}$, whereupon the pin may pass into the notch and the bolt is shot by the springs into the socket $c^{10}$, and the wheel C is stopped and locked. Thus in this example of my invention two complete revolutions of the wheel C must occur between successive locking-points.

At the other end of the table A, I provide a suitable head-stock D for the cutter-head. The head-stock has suitable boxes or bearings $d\ d'$ to hold the cutter-head, and between these bearings is set the driving-pulley Y for driving the whole machine. The hub of this driving-pulley bears an external gear-wheel $y$, (see Figs. 2, 3, and 5,) which meshes with a pinion $y'$ on a shaft $y^{10}$, parallel to the axis of the driving-pulley and supported in a suitable bracket $y^{11}$, carried by the head-stock D. The shaft $y^{10}$ bears a bevel-wheel $y^{12}$, which meshes with another bevel-wheel $y^2$ at right angles to the shaft $y^{10}$ and supported on the bracket $y^{21}$ upon the head-stock D. A shaft or collar $y^{20}$, forming the hub of the bevel gear-wheel $y^2$, bears also a gear-wheel $y^{22}$, which meshes with a gear-wheel $y^3$ upon a collar $y^{30}$, which is parallel to the shaft or collar $y^{20}$. This collar $y^{30}$ has upon one end a toothed clutch member $y^{31}$, and the collar revolves upon a shaft $y^4$, which carries a movable clutch-collar $y^{40}$, which is splined upon the shaft $y^4$ and is adapted to engage with the clutch member $y^{31}$. The shaft $y^4$ has also a worm $y^{42}$, which meshes with a worm-wheel E upon the back end of the cutter-head, as explained hereinafter. The shaft $y^4$ is supported in suitable boxes $y^5$ upon a bracket $y^{50}$, carried by the head-stock D. A handle device $y^{43}$ upon the end of the shaft $y^4$ may be used when it is desired to operate the worm and the connected parts by hand. The collar $y^{40}$ has a groove $y^{41}$, in which rests a feather $y^6$ upon a block $y^{60}$, which moves in a guideway $y^{61}$ upon the bracket $y^{50}$. The block $y^{60}$ moves in its guides at right angles to the line of the shaft $y^4$; but the feather upon said block is arranged diagonally thereon, as shown in Fig. 2, so that longitudinal movement of the block in its guides causes a longitudinal movement of the collar $y^{40}$ and causes engagement and disengagement of the clutch members $y^{30}$ and $y^{40}$. An adjusting-screw $y^{61}$ (see Fig. 4) extends from the block $y^{60}$ through a pair of set-nuts $y^{62}$ and through a standard $y^7$ in order to adjust the position of the block with reference to said standard $y^7$. This standard $y^7$ extends upwardly from a T-shaped bell-crank lever $Y^7$, which is pivoted at the intersection of its arms to the base of the head-stock D. (See Fig. 2.) One of the arms bears the standard $y^7$, and to another of the arms is pivoted a rod $Y^8$, which connects with one arm of a bell-crank lever $Y^9$, which is pivoted to the brackets $c^{50}$. (Shown in Figs. 4 and 6.) The other arm of said bell-crank lever $Y^9$ is connected to the bolt $C^5$. A third arm of the bell-crank lever $Y^7$ is connected to and is operated by a rod $Y^{70}$, whereby the lever $Y^7$ may be operated by hand. If now the rod $Y^{70}$ is operated from the position shown in Figs. 2 and 3, the bell-crank lever $Y^7$ is turned upon its pivot and at the same time operates the block $y^{60}$, so that the clutch-collar $y^{40}$ is moved into engagement with its driving clutch member $y^{30}$, and at the same time the other rod $Y^8$ causes the locking-bolt $C^5$ to be withdrawn from the notch $c^{10}$, thus freeing the wheel C, so that through the train of gearing hereinbefore described the revolving of the driving-pulley Y may drive the worm-wheel E and the chuck-driving wheel C. In the form of device shown the operator must hold the rod $Y^{70}$ in its extended position until the periphery of the disk $C^6$ comes in front of the pin $c^{05}$, whereupon the lock remains disengaged and the clutch remains engaged until the next notch $c^6$ in the disk $C^6$ registers with the pin $c^{05}$.

The cutter-head remains to be described, and for this purpose reference may be had to Figs. 5, 7, 8, and 11. This cutter-head has a slow rotary movement produced by the worm $y^{42}$ and worm-wheel E and contains in the form shown four cutter-heads, each of which has a high speed of rotation. This high speed of rotation of the individual cutter-heads is obtained by direct transmission from the driving-pulley Y, while the slow speed of rotation of the whole head is derived from the train of gearing for driving the worm $y^{42}$ and the worm-wheel E. In the form of device shown in the drawings the rotation of the driving-pulley Y is reduced about as three hundred and sixty to one in the slow rotation of the whole cutter-head, while the cutters themselves have a higher speed of rotation than the driving-pulley. In order that the parts composing the cutter-head shall be compact and shall be easily removable, I arrange them as now to be described. The driving-pulley Y has an extended hub $y^0$, which rests in a suitable recess or bearing in the inner end of the box $d'$, and within this hub is the extended hub $e$ of the worm-wheel E. The worm-wheel E has a shoulder $e'$, which rests against the outer end of the box $d'$, and the pulley Y has a shoulder $y^{0'}$, which rests against the other end of the journal-box $d'$. The hub of the pulley Y bears an internal gear-wheel $Y^{0'}$ for driving the individual cutter-mandrels, as hereinafter described. In the journal-box $d$ and inside the extended hub $e$ of the worm-wheel E is the cutter-head mandrel F, which has a flange $f$ bearing against the outer face of the box $d$. This cutter-head mandrel extends backward through the extended hub $e$ of the worm-wheel E, and the cutter-head mandrel F and hub of the worm-wheel E are fastened together in any suitable manner, so as to rotate together, as by the clamping-cap $E'$, resting against the hub of the worm-wheel, and the screw $E^2$, fastening the cutter-head mandrel F and the cap $E'$ together. The cutter-head mandrel F in the form of device shown in the drawings has four longitudinal parallel perforations in which rotate the four cutter-mandrels G. The cutter-head mandrel F is reduced in diameter about midway of its length, as at $f'$, Figs. 5 and 11, so as to form a shoulder, which rests against the end of the extended hub $e$ of the worm-wheel E. Each cutter-mandrel is reduced in diameter in the same plane mentioned, forming a shoulder $g^0$, which rests against a corresponding shoulder in its own socket or perforation in the cutter-head mandrel F, and on the larger portion of the cutter-mandrel next adjacent to this shoulder teeth are cut to form pinions $g'$, which mesh with the internal gear $Y^{0'}$ of the driving-pulley Y. If, now, the pulley Y, through the reducing-train, drives the worm-wheel E at the same time that the internal gear $Y^{0'}$ drives each cutter-mandrel G, the cutter-head mandrel F will be driven at a slow speed of rotation, while the cutter-mandrels will be driven at very high rotational speed. Adjacent to the internal gear $Y^{0'}$ a bevel gear-wheel F' is fastened, as by the key $f^{0'}$, Fig. 11, upon the cutter-head mandrel F, so as to revolve therewith, and this bevel gear-wheel meshes with the teeth upon the chuck-driving wheel C, thus rotating the chuck-plates $C^{10}$ and $C^{20}$ at a speed of rotation always having a uniform ratio of velocity with reference to the velocity of rotation of the cutter-head mandrel and driving the chuck by positive direct connection between the chuck and the cutter-head. In the device illustrated in the drawings the parts are so proportioned as to cut a blank having thirty-seven teeth, as shown in Fig 6. It is obvious that changes in the bevel-gears F' and C (one or both) are necessary for each change in the size of the gear to be cut by the machine.

The milling-cutters H are shown as cylindrical and have teeth, as shown, on the surface of the cylinder and also have cutting-teeth on the outer ends. The stems of these cutters rest in chuck-sockets in order to be firmly held in the cutter-mandrels G. These chucks H' are of conical form and have central cylindrical perforations wherein the cutters may rest and are also slit longitudinally, as at $h'$, Figs. 5 and 8, in order to spring together in order to grasp the cutters. These chucks are conical on the outside and fit into corresponding conical recesses in the end of the chuck-mandrels G. The bottoms of the recesses are screw-threaded, and the ends of the chucks H' are screw-threaded to engage with the threads in the bottoms of the sockets in the mandrels G. The ends of the chucks H' protrude from the mandrels G, and each one is flattened on two sides, as shown at $h$, Fig. 5, so as to be engaged by a wrench or spanner in order to tighten or loosen the chucks H' for clamping or releasing the milling-cutters H. The rear ends of the cutter-mandrels G are threaded, as at $g^2$, for engagement by nuts $g^3$, which hold the mandrels G in place in the cutter-head mandrel F. Of course any suitable means other than those just described may be employed for holding the mandrels G in place in the head F, and it is also obvious that many other changes may be made in my device without departing from the invention illustrated by the embodiment set forth herein.

In general I do not intend that my claims shall be limited to the specific forms or devices or combinations and arrangements herein particularly described, and I do intend that my claims shall be read and construed with all the breadth that the actual state of the art shall permit.

The operation of the machine is as follows: Starting from the position of rest shown in the drawings, the finished blank is removed and a new blank having a proper central perforation is inserted between the chuck-plates $C^{10}$ and $C^{20}$. The rod $C^3$ is passed through the blank and is screwed into the threaded socket in the shaft C', thus clamping the blank in the chuck. It will be understood that previously and by operation of the screw $b^2$ the plate $B^2$, which supports the chuck and its driving-wheel C, has been moved toward the left in Fig. 2 in order to clear the blank from the cutters H. Having inserted a new blank, as above described, the operation of the screw $b^2$ brings the parts back into position, so that a cutter H, driven from the driving-pulley Y, may cut into the blank as the chuck is brought up to place. Of course the blank may be partly prepared with square slots across its edge, substantially as shown in Fig. 1, whereupon by setting the blank in the proper position it may be brought up to the cutters H. The driving-pulley Y is now set in motion, if it has been stopped, and the milling-cutters immediately revolve. Having set a blank in the proper position with reference to the cutters, the handle $Y^{70}$ is pulled from the position shown in the figures, so as to rock the bell-crank lever $Y^7$ and to pull the bolt $C^5$ out from the notch $c^{10}$ in the driving-wheel C and at the same time to bring together the clutch members $y^{30}$ and $y^{40}$, thus putting in operation the screw $Y^{12}$, causing the slow revolution of the cutter-head, and with it the revolution of the gear-wheel C. If the blank is so set with reference to the series of cutters that their axes pass across but not entirely through the edge of the blank, (see Figs. 9 and 10,) teeth will be formed upon the edges of the blank with warped flanks or side surfaces, substantially as indicated in said Figs. 9 and 10, and the four cutters shown being equidistant but properly separated will cut the spaces between alternate pairs of teeth, as shown in Fig. 10. Each cutter as it comes into the space between a pair of teeth cuts first the side surfaces, (marked 1,) when the movements of the parts are as indicated by the arrows in Fig. 10, and then cuts the surface of the tooth marked 2. The next adjoining space between the teeth (marked 3 in Fig. 10) is skipped by the cutters when arranged as herein described, and the side surface 4 is next cut by the cutter indicated by the circle 1 H. As it enters into the space 5 in Fig. 10 the cutter indicated by $w$ and in Fig. 9 the cutter indicated by H has reached its extreme depth of cut, so that its axis has not passed entirely across the blank X. As the cutter indicated by the circle 1 H continues its movement the surface marked 6, Fig. 10, will be cut away to form the side surface of a tooth opposite to the surface marked 4. The space marked 7 will be skipped and the cutter 2 H will cut the tooth-surfaces of the slot 9.

In Fig. 9 is shown a series of positions of the cutter H as it passes into and out of a space between two adjacent teeth 2' and 1'.

By providing a series of threaded sockets in the table A for the screws c', which hold the chuck-supporting device upon the table, I may change the angle of the axis of the chucks with reference to the axis of the cutter-head or mandrel F in order to cut the teeth upon the blank X for operation at different angles with the pin-wheel with which they are to mesh.

The rectangular slots cut across the edge of the blank X, as shown in Fig. 1 and as indicated in Figs. 9 and 10, need not be made in the disk before it is operated upon by my machine, although it is best to prepare the blank in advance to this extent and to spare the gear-cutter in this way.

By means of this machine I produce teeth which approximate in the highest degree the true tooth form for engagement with a pin-wheel. The cutters H may have the exact form of the pins upon the pin-wheel whether the said pins are cylindrical, conical, or of other suitable form, and the teeth which are cut by these cutters upon a blank of the proper diameter will mesh exactly with a pin-gear which is set to move with reference to the rotation of the wheel formed from the blank just as the series of cutters move with relation thereto in cutting teeth thereon. After the cutters have passed once around the disk and have cut alternate tooth-spaces thereon, if with the parts arranged as herein shown the diameter of the blank is such as to permit the cutting of an uneven number of these teeth upon the edge thereof, the cutters will begin to cut the alternate spaces theretofore uncut until the blank has made a second complete revolution, whereupon the bolt $C^5$ shoots into the notch $c^{10}$ and locks the wheel C, and at the same time by the action of the spring $C^{15}$, through the bell-crank lever $Y^9$, rod $Y^8$, and bell-crank $Y^7$, the clutch members $y^{30}$ and $y^{40}$ will be separated and the revolution of the cutter-head stops automatically. The cutter-head may be adjusted as to rotation about its axis by turning the hand-wheel $y^{43}$, which operates the worm $y^{42}$ independently of the operation of the clutch members which normally drive the worm.

It is obvious that if three of the milling-cutters are removed from the cutter-head a blank may be completely cut by the single remaining cutter, but that more revolutions of the chuck will be required in order to cut all the teeth. In some cases the method known as "indexing" may have to be employed in setting the chuck with reference to the cutter-head.

What I claim is—

1. In a gear-cutter, the combination of a rotary chuck, a rotary cutter-head, a series of rotary milling-cutters carried by said cutter-head and having their axes of rotation eccentric to the axis of rotation of the cutter-head, means for driving the cutters at cutting speed, means for rotating the cutter-head, and driving mechanism for simultaneously rotating the chuck and the cutter-head with uniform ratio of velocity.

2. In a gear-cutter, the combination of a rotary chuck, a rotary cutter-head, a series of like rotary milling-cutters carried by said cutter-head and having their axes of rotation equidistant from the axis of rotation of the cutter-head, means for driving the cutters at cutting speed, means for rotating the cutter-head, and driving mechanism for simultaneously rotating the chuck and the cutter-head with uniform ratio of velocity.

3. In a gear-cutter, the combination of a rotary chuck, a rotary cutter-head, a series of like rotary milling-cutters carried by the cutter-head and having their axes of rotation eccentric to the axis of rotation of the cutter-head, adjusting devices for moving the chuck to and from the cutters, means for driving the cutters at cutting speed, means for rotating the cutter-head, and driving mechanism for simultaneously rotating the chuck and the cutter-head with uniform ratio of velocity.

4. In a gear-cutter, the combination of a rotary chuck, a rotary cutter-head, a series of like rotary milling-cutters carried by said cutter-head and having their axes of rotation eccentric to the axis of rotation of the cutter-head, means for driving the cutter at cutting speed, means for rotating the cutter-head, a single driving means for driving the cutter and for rotating the cutter-head, and driving mechanism for rotating the chuck with uniform ratio of velocity as to the cutter-head.

5. In a gear-cutter, the combination of a rotary chuck, a rotary cutter-head, a series of like rotary milling-cutters carried by said cutter-head and having their axes of rotation eccentric to the axis of rotation of the cutter-head, means for driving the cutters at cutting speed, means for rotating the cutter-head, driving mechanism for simultaneously rotating the chuck and the cutter-head with uniform ratio of velocity, mechanism for locking the driving mechanism for the chuck at a definite position in the rotation of the chuck, and co-operating devices for disconnecting the action of the devices for rotating the cutter-head and for rotating the chuck.

6. In a gear-cutter, the combination of a rotary chuck, a rotary cutter-head, a series of like rotary milling-cutters carried by said cutter-head and having their axes of rotation eccentric to the axis of rotation of the cutter-head, means for driving the cutters at cutting speed, means for rotating the cutter-head, driving mechanism for simultaneously rotating the chuck and the cutter-head with uniform ratio of velocity, and devices for locking said driving mechanism at a definite position in the rotation of the chuck.

7. In a gear-cutter, the combination of a rotary chuck, a rotary cutter-head, a series of like rotary milling-cutters carried by said cutter-head and having their axes of rotation parallel to each other and eccentric to the axis of rotation of the cutter-head, means for driving the cutters at cutting speed, means for rotating the cutter-head, driving mechanism for rotating the chuck with a constant velocity ratio as to the cutter-head, and angularly-adjustable bearings for said chuck and for said cutter-head whereby the chuck and cutter-head operate at an angle to each other and in such position that the cutters cut teeth transversely upon a blank in the chuck.

8. In a gear-cutter, the combination of a rotary chuck, a rotary cutter-head, a series of parallel rotary milling-cutters carried by said cutter-head and having their axes of rotation eccentric to the axis of rotation of the cutter-head, said cutters being rotatable independently of said cutter-head, a driving-pulley, means for rotating the cutter-head from the driving-pulley at one speed, means for rotating each milling-cutter from the driving-pulley at another speed, and driving mechanism for rotating the chuck with uniform ratio of velocity as to the cutter-head.

9. In a gear-cutter, the combination of a rotary chuck, a rotary cutter-head, a series of parallel rotary milling-cutters carried by said cutter-head and having their axes of rotation eccentric to the axis of rotation of the cutter-head, said cutters being rotatable independently of said cutter-head, a driving-pulley, means for rotating the cutter-head from the driving-pulley at one speed, means for rotating each milling-cutter from the driving-pulley at another speed, driving mechanism for rotating the chuck with uniform ratio of velocity as to the cutter-head, and automatic devices for stopping and locking the chuck at a definite position in the rotation of the chuck.

10. In a gear-cutter, the combination of a rotary chuck, a rotary cutter-head, a series of parallel rotary milling-cutters carried by said cutter-head and having their axes of rotation eccentric to the axis of rotation of the cutter-head, a driving-pulley, means comprising a worm-gearing for rotating the cutter-head from the driving-pulley at one speed, means for rotating each milling-cutter from the driving-pulley at another speed, means for rotating the chuck with uniform ratio of velocity as to the cutter-head, a clutch for connecting and disconnecting the worm-gearing from the action of the driving-pulley, and devices cooperating with said clutch for locking the chuck at a definite position in its rotation.

11. In a gear-cutter, the combination of a rotary chuck, a rotary cutter-head having its axis of rotation at an angle to that of the chuck, one or more milling-cutters carried by said cutter-head, each having its axis of rotation eccentric to the axis of rotation of the cutter-head, mechanism for automatically feeding said chuck by rotation upon its axis and by positive connection with the cutter-head whereby to cut a series of teeth upon a blank held by said chuck, mechanism for driving said cutters at cutting speed, and mechanism for driving said cutter-head and said chuck simultaneously with uniform ratio of velocity.

12. In a gear-cutter, the combination of a rotary chuck, a rotary cutter-head having its axis of rotation at an angle to that of the chuck, one or more milling-cutters carried by said cutter-head, each having its axis of rotation eccentric to the axis of rotation of the cutter-head, mechanism for automatically feeding said chuck by rotation upon its axis and by positive connection with the cutter-head whereby to cut a series of teeth upon a blank held by said chuck, mechanism for driving said cutters at cutting speed, mechanism for driving said cutter-head and said chuck simultaneously with uniform ratio of velocity, and mechanism for adjusting said chuck toward and from the cutters in a line transverse to the axis of the cutter-head.

13. In a gear-cutter, the combination of a rotary chuck, a rotary cutter-head having its axis of rotation at an angle to that of the chuck, one or more milling-cutters carried by said cutter-head, each having its axis of rotation eccentric to the axis of rotation of the cutter-head, mechanism for automatically feeding said chuck by rotation upon its axis and by positive connection with the cutter-head, whereby to cut a series of teeth upon a blank held by said chuck, mechanism for driving said cutters at cutting speed, mechanism for driving said cutter-head and said chuck simultaneously with uniform ratio of velocity, mechanism for adjusting said chuck toward and from the cutters in a line transverse to the axis of the cutter-head, and stops for determining the extent of movement of said means for adjusting the chuck.

14. In a gear-cutter, the combination of a rotary chuck, a rotary cutter-head having its axis of rotation at an angle to that of the chuck, one or more milling-cutters carried by said cutter-head, each having its axis of rotation eccentric to the axis of rotation of the cutter-head, mechanism for automatically feeding said chuck by rotation upon its axis and by positive connection with the cutter-head, whereby to cut a series of teeth upon a blank held by said chuck, mechanism for driving said cutters at cutting speed, and mechanism for driving said cutter-head and said chuck simultaneously with uniform ratio of velocity, said chuck being carried by cross-slides having adjustable stops for determining the limits of its movement.

15. In a gear-cutter, the combination of a rotary chuck, a rotary cutter-head having its axis of rotation at an angle to that of the chuck, one or more milling-cutters carried by said cutter-head each having its axis of rotation eccentric to the axis of rotation of the cutter-head, mechanism for automatically feeding said chuck by rotation upon its axis and by positive connection with the cutter-head, whereby to cut a series of teeth upon a blank held by said chuck, mechanism for driving said cutters at cutting speed, mechanism for driving said cutter-head and said chuck simultaneously with uniform ratio of velocity, and mechanism for locking the chuck at a definite position in the rotation thereof.

16. In a gear-cutter, the combination of a rotary chuck, a rotary cutter-head having its axis of rotation at an angle to that of the chuck, one or more milling-cutters carried by said cutter-head, each having its axis of rotation eccentric to the axis of rotation of the cutter-head, mechanism for automatically feeding said chuck by rotation upon its axis and by positive connection with the cutter-head, whereby to cut a series of teeth upon a blank held by said chuck, mechanism for driving said cutters at cutting speed, mechanism for driving said cutter-head and said chuck simultaneously with uniform ratio of velocity, mechanism for locking the chuck at a definite position in the rotation thereof, and coöperating devices for disconnecting the action of the devices for driving the cutter-head and the chuck.

17. In a gear-cutter, the combination of a rotary chuck, a rotary cutter-head having its axis of rotation at an angle to that of the chuck, a rotary milling-cutter carried by said cutter-head and having its axis of rotation eccentric to that of the cutter-head, means for driving the cutter at cutting speed, means for rotating the cutter-head and the chuck simultaneously with uniform ratio of velocity, whereby the cutter moves in a circular path toward and from the chuck while the chuck revolves upon its axis.

18. In a gear-cutter, the combination of a rotary chuck, a rotary cutter-head having its axis of rotation at an angle to that of the chuck, a rotary milling-cutter carried by said cutter-head and having its axis of rotation eccentric to that of the cutter-head, means for driving the cutter at cutting speed, mechanism for rotating the cutter-head and the chuck simultaneously with uniform ratio of velocity by positive connection between the chuck and the cutter-head, whereby the cutter moves in a circular path toward and from the chuck while the chuck is revolving upon its axis.

19. In a gear-cutter, the combination of a rotary chuck, a rotary cutter-head having its axis of rotation at an angle to that of the chuck, a rotary milling-cutter carried by said cutter-head and having its axis of rotation eccentric to that of the cutter-head and parallel thereto, means for driving the cutter at cutting speed, and mechanism for driving the cutter-head and said chuck simultaneously with uniform ratio of velocity, whereby the cutter moves in a circular path toward and from the chuck while the chuck revolves upon its axis.

20. In a gear-cutter, the combination of a rotary chuck, a rotary cutter-head having its axis of rotation at an angle to that of the chuck, a rotary milling-cutter carried by said cutter-head having its axis of rotation eccentric to that of the cutter-head and parallel thereto, means for driving the cutter at cutting speed, and mechanism for driving said cutter-head and said chuck simultaneously with uniform ratio of velocity by positive connection between the chuck and the cutter-head, whereby the cutter moves in a circular path toward and from the chuck while the chuck revolves upon its axis.

21. In a gear-cutter, the combination of a rotary chuck, a rotary cutter-head having its axis of rotation at an angle to that of the chuck, a rotary milling-cutter carried by said cutter-head and having its axis of rotation eccentric to that of the cutter-head, means for driving the cutter at cutting speed, means for rotating the cutter-head and the chuck simultaneously with uniform ratio of velocity, whereby the cutter moves in a circular path toward and from the chuck while the chuck revolves upon its axis, and automatic devices for locking said chuck at a definite position in its rotation.

22. In a gear-cutter, the combination of a rotary chuck, a rotary cutter-head having its axis of rotation at an angle to that of the chuck, a rotary milling-cutter carried by said cutter-head and having its axis of rotation eccentric to that of the cutter-head, means for driving the cutter at cutting speed, mechanism for rotating the cutter-head and the chuck simultaneously with uniform ratio of velocity by positive connection between the chuck and the cutter-head, whereby the cutter moves in a circular path toward and from the chuck while the chuck revolves upon its axis, and automatic devices for locking said chuck at a definite position in its rotation.

23. In a gear-cutter, the combination of a rotary chuck, a rotary cutter-head having its axis of rotation at an angle to that of the chuck, a rotary milling-cutter carried by said cutter-head and having its axis of rotation eccentric to that of the cutter-head, means for driving the cutter at cutting speed, mechanism for rotating the cutter-head and the chuck simultaneously with uniform ratio of velocity by positive connection between the chuck and the cutter-head, whereby the cutter moves in a circular path toward and from the chuck while the chuck revolves upon its axis, automatic devices for locking said chuck at a definite position in its rotation, and coöperating devices for disconnecting the action of the mechanism for rotating the cutter-head and the chuck.

24. In a gear-cutter, the combination of a rotary cutter-head containing a rotary cutter-mandrel eccentric to the axis of the cutter-head, said mandrel having a pinion thereon, a driving-pulley having an internal gear meshing with said pinion, mechanism for driving said cutter-head from said pulley, a rotary chuck, and gearing for driving said chuck from said cutter-head.

25. In a gear-cutter, the combination of a rotary cutter-head containing a rotary cutter-mandrel having its axis eccentric to that of the cutter-head, said mandrel having a pinion thereon, a driving-pulley having an internal gear meshing with said pinion, mechanism for driving said cutter-head from said pulley, a rotary chuck, gearing for driving said chuck from said cutter-head, and automatic mechanism for disconnecting the mechanism for driving the cutter-head at a definite position in the rotation of the chuck.

26. In a gear-cutter, the combination of a rotary cutter-head containing a rotary cutter-mandrel having its axis eccentric to that of the cutter-head, said mandrel having a pinion thereon, a driving-pulley having an internal gear meshing with said pinion, mechanism for driving said cutter-head from said pulley, a rotary chuck, gearing for driving said chuck from said cutter-head, automatic mechanism for disconnecting the mechanism for driving the cutter-head at a definite position in the rotation of the chuck, and coöperating mechanism for locking the chuck at said definite position in its rotation.

27. In a gear-cutter, the combination of a rotary cutter-head containing a series of parallel rotary cutter-mandrels, each mandrel having a pinion thereon, a driving-pulley having an internal gear meshing with said pinions, an external gear upon said driving-pulley, a train of gearing from said external gear to said cutter-head, a rotary chuck, and gearing for driving said chuck from said cutter-head.

28. In a gear-cutter, the combination of a rotary cutter-head containing a series of parallel rotary cutter-mandrels, each mandrel having a pinion thereon, a driving-pulley having an internal gear meshing with said pinions, an external gear upon said driving-pulley, a train of gearing from said external gear to said cutter-head, a rotary chuck, gearing for driving said chuck from said cutter-head, means for connecting and disconnecting said train of gearing, and automatic means for locking the chuck at a definite position in its rotation.

29. In a gear-cutter, the combination of a rotary cutter-head containing a series of parallel rotary cutter-mandrels, each mandrel having a pinion thereon, a driving-pulley having an internal gear meshing with said pinions, an external gear upon said driving-pulley, a train of gearing from said extrnal gear to said cutter-head, a rotary chuck, gearing for driving said chuck from said cutter-head, automatic means for locking the chuck at a definite position in its rotation, and means operating simultaneously with said automatic locking means for disconnecting the action of the driving mechanism from said cutter-head and from said chuck.

30. In a gear-cutter, the combination of a rotary cutter-head containing a series of parallel rotary cutter-mandrels, each mandrel having a pinion thereon, a driving-pulley having an internal gear meshing with said pinions, an external gear upon said driving-pulley, a train of gearing from said external gear to said cutter-head, a rotary chuck, gearing for driving the chuck from said cutter-head, automatic means for locking the chuck at a definite position in its rotation, and means operated by said locking means for disconnecting the action of the driving-pulley from said cutter-head and from said chuck.

31. In a gear-cutter, the combination of a rotary chuck, a cutter-head F containing one or more rotary cutter-mandrels G, each mandrel having a chuck H' for a cutter and a pinion $g'$ whose teeth protrude through the surface of the cutter-head, a worm-wheel E fastened to said cutter-head, a driving-pulley Y having an internal gear $Y^{0'}$ meshing with the pinions of said cutter-mandrels and an external gear $y$, a worm $y^{42}$ meshing with the worm-wheel E for driving the cutter-head, a worm-shaft $y^4$, a pair of clutch members $y^{30}$, $y^{40}$ on said worm-shaft $y^4$, a train of gearing from said external gear to one of said clutch members, and driving mechanism for said clutch actuated from said cutter-head.

32. In a gear-cutter, the combination of a rotary chuck, a cutter-head F, fitting in a bearing-box $d$ and containing one or more rotary cutter-mandrels G, each mandrel having a chuck H' for a cutter and a pinion $g'$ whose teeth protrude through the surface of the cutter-head, a worm-wheel E fastened to said cutter-head having an extended hub $e$ fitting on one end of said cutter and in a bearing-box $d'$, a driving-pulley Y having a hub portion $y^0$ fitting upon said extended hub $e$ and within a portion of said box $d'$, an internal gear $Y^{0'}$ on said pulley Y meshing with said pinions $g$, an external gear $y$ upon said driving-pulley, a worm $y^{42}$ meshing with said worm-wheel E, a worm-shaft $y^4$, a pair of clutch members $y^{30}$, $y^{40}$ on said worm-shaft, a train of gearing from said external gear to one of said clutch members and driving mechanism for said chuck actuated from said cutter-head.

33. The combination of a rotary cutter-head, a series of independently-rotatable cutter-mandrels carried by said head, means for driving said cutter-head and said cutter-mandrels, a chuck device consisting of the clamping-plates $C^{10}$, $C^{20}$, the shafts C' $C^2$ rotatable in suitable bearings and each carrying one of said clamping-plates, a clamping-rod $C^3$ having a collar $c^{30}$ passing through the shaft $C^2$ and adapted to be screwed into the shaft C', whereby to move the plate $C^{20}$ and to clamp a blank between said chuck-plates, a gear-wheel C upon said shaft C', and a gear-wheel F' upon said cutter-head for meshing with said gear-wheel C.

34. The combination of a rotary cutter-head, one or more rotatable cutter-mandrels carried by said cutter-head, a gear-wheel on said cutter-head, a driving-pulley having gearing for rotating said cutter-mandrels, a train of gearing from said pulley to said cutter-head, a chuck device comprising a gear-wheel C for gearing with said gear-wheel on the cutter-head, a socket $c^{10}$ in said gear-wheel C, a spring-bolt $C^5$ adapted to enter said socket and to lock said gear-wheel and the chuck at a definite position in the rotation of the latter, a rotary circular plate $C^6$, and having one or more peripheral slots, $c^6$, a pin $c^{05}$ upon the bolt $C^5$ adapted to enter the slot $c^6$ when, in the revolution of the plate $C^6$, the slot registers with the position of the pin, and means for rotating said plate $C^6$ by said gear-wheel C.

35. In a gear-cutter, a cutting mechanism comprising a series of rotary milling-cutters corresponding in number and diameter with the pins of a pin-gear with which the completed gear-wheel is intended to engage, bearings for said cutters placed at the same radial and circumferential distances apart as said pins, and means for revolving said cutters on their individual and common axes.

36. In a gear-cutter, a series of rotary milling-cutters operatively mounted to correspond with the pins of a pin-gear, a chuck, means for progressively presenting a blank held by said chuck to the successive action of said cutters, and means for rotating the series of cutters and blank relatively to each other at the relative speeds of the members of the completed gearing.

37. In a gear-cutter, a circularly-arranged series of rotary milling-cutters, means for rotating said series on its axis, independent means for revolving said cutters, each on its own axis, at cutting speed, a rotary chuck, means for feeding a blank held by said chuck to the successive action of said cutters, and means for rotating the blank and series of cutters at the relative speeds of the members of the completed gearing.

38. In a gear-cutter, a chuck adapted to turn about an axis, a cutter-head adapted to turn about an axis, a bearing surrounding said cutter-head, a cutter-holder set non-concentrically to the axis of the cutter-head and having bearings within the cutter-head, mechanism for operating said cutter-holder, and a single driving mechanism for driving the chuck and the cutter-head simultaneously with uniform ratio of velocity.

39. In a gear-cutter, a chuck adapted to turn about an axis, a cutter-head adapted to turn about an axis, a bearing surrounding said cutter-head, a series of cutter-holders each set non-concentrically to the axis of the cutter-head and having bearings within the cutter-head, mechanism for operating said cutter-holders, and a single driving mechanism for driving the chuck and the cutter-head simultaneously with uniform ratio of velocity.

40. In a gear-cutter, a chuck adapted to turn about an axis, a cutter-head adapted to turn about an axis, a bearing surrounding said cutter-head, a series of cutter-holders having bearings within the cutter-head, mechanism for operating said cutter-holders and a single driving mechanism for driving the chuck and the cutter-head simultaneously with uniform ratio of velocity.

41. In a gear-cutter, a chuck adapted to turn about an axis and provided with a toothed gear, a cutter-head adapted to turn about an axis and having a toothed gear meshing with the gear of the chuck, a bearing surrounding said cutter-head, a cutter-holder set non-concentrically to the axis of the cutter-head and having bearings within the cutter-head, mechanism for operating said cutter-holder, and a single driving mechanism for driving the chuck and the cutter-head simultaneously with uniform ratio of velocity.

42. In a gear-cutter, a chuck adapted to turn about an axis, a cutter-head adapted to turn about an axis, a bearing for said cutter-head, a cutter-holder within said cutter-head and passing through the same within the bearing, means for producing a cutting movement of the cutter, and means for turning the cutter-head and the chuck simultaneously with uniform ratio of velocity.

43. In a gear-cutter, a chuck adapted to turn about an axis, a cutter-head adapted to turn about an axis, a bearing for said cutter-head, means within said cutter-head for holding a plurality of cutters, said means passing through the cutter-head within the bearing, means for producing cutting movement of the cutters, and means for turning the cutter-head and the chuck with uniform ratio of velocity.

44. In a gear-cutter, a chuck adapted to turn about an axis, a cutter-head adapted to turn about an axis, a bearing for said cutter-head, a cutter-holder within said cutter-head and passing through the same within the bearing, means for producing a cutting movement of the cutter, a toothed gear attached to said chuck, a toothed gear attached to said cutter-head and meshing with the gear of the chuck, and a single driving mechanism for said intermeshing gears.

45. In a gear-cutter, a chuck adapted to turn about an axis, a cutter-head adapted to turn about an axis, a bearing for said cutter-head, means within said cutter-head for holding a plurality of cutters, said means passing through the cutter-head within the bearing, means for producing cutting movement of the cutters, a toothed gear attached to said chuck, a toothed gear attached to said cutter-head and meshing with the gear of the chuck, and a single driving mechanism for said intermeshing gears.

46. In a gear-cutter, a chuck adapted to turn about an axis, a cutter-head adapted to turn about an axis, a bearing for said cutter-head, a cutter-holder within said cutter-head and passing through the same within the bearing, means for producing cutting movement of the cutter, and means for turning the cutter-head and the chuck simultaneously with uniform ratio of velocity, comprising a worm mechanism for actuating the same.

47. In a gear-cutter, a chuck adapted to turn about an axis, a cutter-head adapted to turn about an axis, a bearing for said cutter-head, means within said cutter-head for holding a plurality of cutters, said means passing through the cutter-head within the bearing, means for producing cutting movement of the cutters, and means for turning the cutter-head and the chuck with uniform ratio of velocity, comprising a worm mechanism for actuating the same.

48. In a gear-cutter, a chuck adapted to turn about an axis, a cutter-head adapted to turn about an axis, a bearing for said cutter-head, a cutter-holder within said cutter-head and passing through the same within the bearing, means for producing cutting movement of the cutter, a toothed gear attached to said chuck, a toothed gear attached to said cutter-head and meshing with the gear of the chuck, and a single driving mechanism for said intermeshing gears, comprising a worm mechanism for actuating the same.

49. In a gear-cutter, a chuck adapted to turn about an axis, a cutter-head adapted to turn about an axis, a bearing for said cutter-head, means within said cutter-head for holding a plurality of cutters, said means passing through the cutter-head within the bearing, means for producing cutting movement of the cutters, a toothed gear attached to said chuck, a toothed gear attached to said cutter-head and meshing with the gear of the chuck, and a single driving mechanism for said intermeshing gears, comprising a worm mechanism for actuating the same.

50. In a gear-cutter, a chuck adapted to turn about an axis, a cutter-head adapted to turn about an axis, a cutter carried by said cutter-head and set non-concentrically to the axis thereof, a driving-wheel having an internal gear, a pinion attached to said cutter and meshing with said internal gear, and means for turning the cutter-head and the chuck simultaneously with uniform ratio of velocity.

51. In a gear-cutter, a chuck adapted to turn about an axis, a cutter-head adapted to turn about an axis, a cutter carried by said cutter-head and set non-concentrically to the axis thereof, a driving-wheel having an internal gear, a pinion attached to said cutter and meshing with said internal gear, a toothed gear attached to said chuck a toothed gear attached to said cutter-head and meshing with the gear of the chuck, and means for driving said intermeshing gearing.

52. In a gear-cutter, a chuck adapted to turn about an axis, a cutter-head adapted to turn about an axis, a cutter carried by said cutter-head and set non-concentrically to the axis thereof, a driving-wheel having an internal gear, a pinion attached to said cutter and meshing with said internal gear, a toothed gear attached to said chuck, a toothed gear attached to said cutter-head and meshing with the gear of the chuck, and a worm driving mechanism for actuating said intermeshing gear.

53. In a gear-cutter, a chuck adapted to turn about an axis, a cutter-head adapted to turn about an axis, a bearing for said cutter-head, a cutter-holder within said cutter-head and passing through the same within the bearing, means for producing cutting movement of the cutter, means for turning the cutter-head and the chuck simultaneously with uniform ratio of velocity, and means for automatically stopping the action of the driving mechanism.

54. In a gear-cutter, a chuck adapted to turn about an axis, a cutter-head adapted to turn about an axis, a bearing for said cutter-head, means within said cutter-head for holding a plurality of cutters, said means passing through the cutter-head within the bearing, means for producing cutting movement of the cutters, means for turning the cutter-head and the chuck with uniform ratio of velocity, and means for automatically stopping the action of the driving mechanism.

55. In a gear-cutter, a chuck adapted to turn about an axis, a cutter-head adapted to turn about an axis, a bearing for said cutter-head, a cutter-holder within said cutter-head and passing through the same within the bearing, means for producing cutting movement of the cutter, a toothed gear attached to said chuck, a toothed gear attached to said cutter-head and meshing with the gear of the chuck, a single driving mechanism for said intermeshing gears, and means for automatically stopping the action of the driving mechanism.

56. In a gear-cutter, a chuck adapted to turn about an axis, a cutter-head adapted to turn about an axis, a bearing for said cutter-head, means within said cutter-head for holding a plurality of cutters, said means passing through the cutter-head within the bearing, means for producing cutting movement of the cutters, a toothed gear attached to said chuck, a toothed gear attached to said cutter-head and meshing with the gear of the chuck, a single driving mechanism for said intermeshing gears, and means for automatically stopping the action of the driving mechanism.

57. In a gear-cutter, a chuck adapted to turn about an axis, a cutter-head adapted to turn about an axis, a bearing for said cutter-head, a cutter-holder within said cutter-head and passing through the same within the bearing, means for producing cutting movement of the cutter, means for turning the cutter-head and the chuck simultaneously with uniform ratio of velocity, comprising a worm mechanism for actuating the same, and means for automatically stopping the action of the driving mechanism.

58. In a gear-cutter, a chuck adapted to turn about an axis, a cutter-head adapted to turn about an axis, a bearing for said cutter-head, means within said cutter-head for holding a plurality of cutters, said means passing through the cutter-head within the bearing, means for producing cutting movement of the cutters, means for turning the cutter-head and the chuck with uniform ratio of velocity, comprising a worm mechanism for actuating the same, and means for automatically stopping the action of the driving mechanism.

59. In a gear-cutter, a chuck adapted to turn about an axis, a cutter-head adapted to turn about an axis, a bearing for said cutter-head, a cutter-holder within said cutter-head and passing through the same within the bearing, means for producing cutting movement of the cutter, a toothed gear attached to said chuck, a toothed gear attached to said cutter-head and meshing with the gear of the chuck, a single driving mechanism for said intermeshing gears, comprising a worm mechanism for actuating the same, and means for automatically stopping the action of the driving mechanism.

60. In a gear-cutter, a chuck adapted to turn about an axis, a cutter-head adapted to turn about an axis, a bearing for said cutter-head, means within said cutter-head for holding a plurality of cutters, said means passing through the cutter-head within the bearing, means for producing cutting movement of the cutters, a toothed gear attached to said chuck, a toothed gear attached to said cutter-head and meshing with the gear of the chuck, a single driving mechanism for said intermeshing gears, comprising a worm mechanism for actuating the same, and means for automatically stopping the action of the driving mechanism.

61. In a gear-cutter, a chuck adapted to turn about an axis, a cutter-head adapted to turn about an axis, a cutter carried by said cutter-head and set non-concentrically to the axis thereof, a driving-wheel having an internal gear, a pinion attached to said cutter and meshing with said internal gear, means for turning the cutter-head and the chuck simultaneously with uniform ratio of velocity, and means for automatically stopping the action of the driving mechanism.

62. In a gear-cutter, a chuck adapted to turn about an axis, a cutter-head adapted to turn about an axis, a cutter carried by said cutter-head and set non-concentrically to the axis thereof, a driving-wheel having an internal gear, a pinion attached to said cutter and meshing with the said internal gear, a toothed gear attached to said chuck, a toothed gear attached to said cutter-head and meshing with the gear of the chuck, means for driving said intermeshing gearing, and means for automatically stopping the action of the driving mechanism.

63. In a gear-cutter, a chuck adapted to turn about an axis, a cutter-head adapted to turn about an axis, a cutter carried by said cutter-head and set non-concentrically to the axis thereof, a driving-wheel having an internal gear, a pinion attached to said cutter and meshing with said internal gear, a toothed gear attached to said chuck, a toothed gear attached to said cutter-head and meshing with the gear of the chuck worm driving mechanism for actuating said intermeshing gear, and means for automatically stopping the action of the worm-driving mechanism.

64. In a gear-cutter, a chuck adapted to turn about an axis, a cutter-head adapted to turn about an axis, the said two axes being set at an angle to each other, a cutter carried by said cutter-head and set non-concentrically to the axis thereof, means for producing cutting movement of the cutter, means for turning the cutter-head and the chuck simultaneously at predetermined ratio of velocity, and means for moving the chuck and the cutter-head to and from each other.

65. In a gear-cutter, a chuck adapted to turn about an axis, a cutter-head adapted to turn about an axis, the said two axes being set at an angle to each other, a cutter carried by said cutter-head and set non-concentrically to the axis thereof, means for producing cutting movement of the cutter, means for turning the cutter-head and the chuck simultaneously at predetermined ratio of velocity, and means for moving the chuck and the cutter-head to and from each other in the plane of the axes of both of them.

66. In a gear-cutter, a chuck adapted to turn about an axis, a cutter-head adapted to turn about an axis, the said two axes being set at an angle to each other, a cutter carried by said cutter-head and set non-concentrically to the axis thereof, means for producing cutting movement of the cutter, means for turning the cutter-head and the chuck simultaneously at predetermined ratio of velocity, and means for moving the chuck and the cutter-head to and from each other by a movement in the plane of the axis of one of them.

67. In a gear-cutter, a chuck adapted to turn about an axis, a cutter-head adapted to turn about an axis, the said two axes being set at an angle to each other, a cutter carried by said cutter-head and set non-concentrically to the axis thereof, means for producing cutting movement of the cutter-head, means for turning the cutter-head and the chuck simultaneously at predetermined ratio of velocity, and means for moving the chuck and the cutter-head to and from each other by an axial movement of one of them.

68. In a gear-cutter, a chuck adapted to turn about an axis, a cutter-head adapted to turn about an axis, the said two axes being set at an angle to each other, a cutter carried by said cutter-head and set non-concentrically to the axis thereof, means for producing cutting movement of the cutter, means for turning the cutter-head and the chuck simultaneously at predetermined ratio of velocity, and means for moving the chuck and the cutter-head by axial and transverse movement of one of them.

69. In a gear-cutter, a chuck adapted to turn about an axis, a cutter-head adapted to turn about an axis, the said two axes being set at an angle to each other, a cutter carried by said cutter-head and set non-concentrically to the axis thereof, means for producing cutting movement of the cutter, means for turning the cutter-head and the chuck simultaneously at predetermined ratio of velocity, and means for moving the chuck and the cutter-head to and from each other by universal movement in a single plane.

70. In a gear-cutter, a chuck adapted to turn about an axis, a cutter-head adapted to turn about an axis, the said two axes being set at an angle to each other, a cutter carried by said cutter-head and set non-concentrically to the axis thereof, means for producing cutting movement of the cutter, means for turning the cutter-head and the chuck simultaneously at predetermined ratio of velocity, and means for moving the chuck axially to and from the cutter-head.

71. In a gear-cutter, a chuck adapted to turn about an axis, a cutter-head adapted to turn about an axis, the said two axes being set at an angle to each other, a cutter carried by said cutter-head and set non-concentrically to the axis thereof, means for producing cutting movement of the cutter, means for turning the cutter-head and the chuck simultaneously at predetermined ratio of velocity, and means for moving the chuck to and from the cutter-head in a plane passing through the axes of both the chuck and the cutter-head.

72. In a gear-cutter, a chuck adapted to turn about an axis, a cutter-head adapted to turn about an axis, the said two axes being set at an angle to each other, a cutter carried by said cutter-head, and set non-concentrically to the axis thereof, means for producing cutting movement of the cutter, means for turning the cutter-head and the chuck simultaneously at predetermined ratio of velocity, and means for moving the chuck axially and transversely to and from the cutter-head.

73. In a gear-cutter, a chuck adapted to turn about an axis, a cutter-head adapted to turn about an axis, the said two axes being set at an angle to each other, a cutter carried by said cutter-head and set non-concentrically to the axis thereof, means for producing cutting movement of the cutter, means for turning the cutter-head and the chuck simultaneously at predetermined ratio of velocity, means for moving the chuck and the cutter-head to and from each other, and automatic means for stopping the action of the driving mechanism.

74. In a gear-cutter, a chuck adapted to turn about an axis, a cutter-head adapted to turn about an axis, the said two axes being set at an angle to each other, a cutter carried by said cutter-head and set non-concentrically to the axis thereof, means for producing cutting movement of the cutter, means for turning the cutter-head and the chuck simultaneously at predetermined ratio of velocity, means for moving the chuck and the cutter-head to and from each other in the plane of the axis of both of them, and automatic means for stopping the action of the driving mechanism.

75. In a gear-cutter, a chuck adapted to turn about an axis, a cutter-head adapted to turn about an axis, the said two axes being set at an angle to each other, a cutter carried by said cutter-head and set non-concentrically to the axis thereof, means for producing cutting movement of the cutter, means for turning the cutter-head and the chuck simultaneously at predetermined ratio of velocity, means for moving the chuck and the cutter-head to and from each other by a movement in the plane of the axis of one of them, and automatic means for stopping the action of the driving mechanism.

76. In a gear-cutter, a chuck adapted to turn about an axis, a cutter-head adapted to turn about an axis, the said two axes being set at an angle to each other, a cutter carried by said cutter-head and set non-concentrically to the axis thereof, means for producing cutting movement of the cutter-head, means for turning the cutter-head and the chuck simultaneously at predetermined ratio of velocity, means for moving the chuck and the cutter-head to and from each other by an axial movement of one of them, and automatic means for stopping the action of the driving mechanism.

77. In a gear-cutter, a chuck adapted to turn about an axis, a cutter-head adapted to turn about an axis, the said two axes being set at an angle to each other, a cutter carried by said cutter-head and set non-concentrically to the axis thereof, means for producing cutting movement of the cutter, means for turning the cutter-head and the chuck simultaneously at predetermined ratio of velocity, means for moving the chuck and the cutter-head by axial and transverse movement of one of them, and automatic means for stopping the action of the driving mechanism.

78. In a gear-cutter, a chuck adapted to turn about an axis, a cutter-head adapted to turn about an axis, the said two axes being set at an angle to each other, a cutter carried by said cutter-head and set non-concentrically to the axis thereof, means for producing cutting movement of the cutter, means for turning the cutter-head and the chuck simultaneously at predetermined ratio of velocity, means for moving the chuck and the cutter-head to and from each other by universal movement in a single plane, and automatic means for stopping the action of the driving mechanism.

79. In a gear-cutter, a chuck adapted to turn about an axis, a cutter-head adapted to turn about an axis, the said two axes being set at an angle to each other, a cutter carried by said cutter-head and set non-concentrically to the axis thereof, means for producing cutting movement of the cutter, means for turning the cutter-head and the chuck simultaneously at predetermined ratio of velocity, means for moving the chuck axially to and from the cutter-head, and automatic means for stopping the action of the driving mechanism.

80. In a gear-cutter, a chuck adapted to turn about an axis, a cutter-head adapted to turn about an axis, the said two axes being set at an angle to each other, a cutter carried by said cutter-head and set non-concentrically to the axis thereof, means for producing cutting movement of the cutter, means for turning the cutter-head and the chuck simultaneously at predetermined ratio of velocity, means for moving the chuck to and from the cutter-head in a plane passing through the axes of both the chuck and the cutter-head, and automatic means for stopping the action of the driving mechanism.

81. In a gear-cutter, a chuck adapted to turn about an axis, a cutter-head adapted to turn about an axis, the said two axes being set at an angle to each other, a cutter carried by said cutter-head and set non-concentrically to the axis thereof, means for producing cutting movement of the cutter, means for turning the cutter-head and the chuck simultaneously a predetermined ratio of velocity, means for moving the chuck axially and transversely to and from the cutter-head, and automatic means for stopping the action of the driving mechanism.

82. In a gear-cutter, a chuck adapted to turn about an axis, a cutter-head adapted to turn about an axis, a gear attached to said chuck, a gear attached to said cutter-head and intermeshing with the gear attached to the chuck, a belt-wheel carrying an internal gear, a cutter carried by said cutter-head, a pinion for driving said cutter and intermeshing with said internal gear, and means for driving said intermeshing gearing.

83. In a gear-cutter, a chuck adapted to turn about an axis, a cutter-head adapted to turn about an axis, a gear attached to said chuck, a gear attached to said cutter-head and intermeshing with the gear attached to the chuck, a belt-wheel carrying an internal gear, a cutter carried by said cutter-head, a pinion for driving said cutter and intermeshing with said internal gear, and worm driving mechanism for operating said intermeshing gearing.

84. In a gear-cutter, a chuck adapted to turn about an axis, a cutter-head adapted to turn about an axis, a gear attached to said chuck, a gear attached to said cutter-head and intermeshing with the gear attached to the chuck, a belt-wheel carrying an internal gear, a cutter carried by said cutter-head, a pinion for driving said cutter and intermeshing with said internal gear, means for driving said intermeshing gearing, and means for automatically stopping the action of the driving mechanism.

85. In a gear-cutter, a chuck adapted to turn about an axis, a cutter-head adapted to turn about an axis, a gear attached to said chuck, a gear attached to said cutter-head and intermeshing with the gear attached to the chuck, a belt-wheel carrying an internal gear, a cutter carried by said cutter-head, a pinion for driving said cutter and intermeshing with said internal gear, worm driving mechanism for operating said intermeshing gearing, and means for automatically stopping the worm driving mechanism.

86. In a gear-cutter, the combination of a rotary chuck, a rotary cutter-head having its axis of rotation at an angle to that of the chuck, a cutter carried by said cutter-head and set eccentrically to the axis thereof, means for producing cutting movement of the cutter, means for rotating the cutter-head and the chuck simultaneously at predetermined ratio of velocity, whereby the cutter moves in a circular path toward and from the chuck, while the chuck revolves upon its axis.

87. In a cutter-head, a cutting mechanism comprising a series of cutters corresponding in number and diameter with the pins of a pin-gear, with which the gear-wheel to be cut is intended to engage, means for supporting said cutters at the same radial and circumferential distances apart as said pins, means for producing cutting movement of said cutters, and means for revolving the set of cutters on a common axis.

88. In a gear-cutter, a series of cutters operatively mounted to correspond with the pins of a pin-gear, a chuck, means for progressively presenting a blank held by said chuck to the successive action of said cutters, means for producing cutting movement of said cutters, and means for rotating the series of cutters and the chuck relatively to each other at the relative speeds of the members of the completed gearing.

89. In a gear-cutter, a circularly-arranged series of cutters, means for rotating said series on its axis, independent means for producing cutting movement of said cutters, a rotary chuck, means for feeding a blank held by said chuck to the successive action of said cutters, and means for rotating the chuck and the series of cutters at the relative speeds of the members of the completed gearing.

90. In a gear-cutter, a circularly-arranged series of cutters, means for producing cutting movement of said cutters, a chuck, means for feeding a blank held by said chuck to the action of said cutters and means for producing relative rotation as between the chuck and the series of cutters at the relative speeds of the members of the completed gearing.

91. In a gear-cutter, a circularly-arranged series of cutters, means for producing cutting movement of said cutters, a chuck, means for feeding a blank held by said chuck to the action of said cutters, means for producing relative rotation as between the chuck and the series of cutters at the relative speeds of the members of the completed gearing, and mechanism for automatically stopping the action of the means for producing the said relative rotation.

92. In a gear-cutter, the combination of a rotary chuck, a rotary cutter-head having its axis of rotation at an angle to that of the chuck, a cutter carried by said cutter-head and set eccentrically to the axis thereof, means for producing cutting movement of the cutter, means for rotating the cutter-head and the chuck simultaneously at predetermined ratio of velocity, whereby the cutter moves in a circular path toward and from the chuck, while the chuck revolves upon its axis, and means for moving the chuck and the cutter-head to and from each other.

93. In a gear-cutter, the combination of a rotary chuck, a rotary cutter-head, a series of cutters carried by said cutter-head and set eccentrically to the axis of rotation of the cutter-head, means for producing cutting movement of the cutters, means for rotating the cutter-head, driving mechanism for simultaneously rotating the chuck and cutter-head at predetermined ratio of velocity, and means for moving the chuck and the cutter-head to and from each other.

94. In a gear-cutter, a cutting mechanism comprising a series of cutters corresponding in number and diameter with the pins of a pin-gear with which the gear-wheel to be cut is intended to engage, means for supporting said cutters at the same radial and circumferential distances apart as said pins, means for producing cutting movement of said cutters, means for revolving the set of cutters on a common axis, and means for moving the chuck and the cutter-head to and from each other.

95. In a gear-cutter, a series of cutters operatively mounted to correspond with the pins of a pin-gear, a chuck, means for progressively presenting a blank held by said chuck to the successive action of said cutters, means for producing cutting movement of said cutters, means for rotating the series of cutters and the chuck relatively to each other at the relative speeds of the members of the completed gearing, and means for moving the chuck and the cutter-head to and from each other.

96. In a gear-cutter, a cutter-head, a cutter set non-concentrically to the axis of the cutter-head, a chuck, means for progressively presenting a blank held by said chuck to the successive actions of said cutter, means for rotating the cutter-head and the chuck relatively to each other at the relative speeds of the members of the completed gearing, and means for moving the chuck and the cutter-head to and from each other.

97. In a gear-cutter, a circularly-arranged series of cutters, means for rotating said series on its axis, independent means for producing cutting movement of said cutters, a rotary chuck, means for feeding a blank held by said chuck to the successive action of said cutters, means for rotating the chuck and the series of cutters at the relative speeds of the members of the completed gearing, and means for moving the chuck and the cutter-head to and from each other.

98. In a gear-cutter, the combination of a rotary chuck, a rotary cutter-head having its axis of rotation at an angle to that of the chuck, a rotary milling-cutter carried by said cutter-head and having its axis of rotation eccentric to that of the cutter-head, means for driving the cutter at cutting speed, means for rotating the cutter-head and the chuck simultaneously at predetermined ratio of velocity, whereby the cutter moves in a circular path toward and from the chuck while the chuck revolves upon its axis, and means for moving the chuck and the cutter-head to and from each other.

99. In a gear-cutter, the combination of a rotary chuck, a rotary cutter-head, a series of rotary milling-cutters carried by said cutter-head and having their axes of rotation eccentric to the axis of rotation of the cutter-head, means for driving the cutters at cutting speed, means for rotating the cutter-head, driving mechanism for simultaneously rotating the chuck and the cutter-head at predetermined ratio of velocity, and means for moving the chuck and the cutter-head to and from each other.

100. In a gear-cutter, a cutting mechanism comprising a series of rotary milling-cutters corresponding in number and diameter with the pins of a pin-gear with which the completed gear-wheel is intended to engage, bearings for said cutters placed at the same radial and circumferential distances apart as said pins, means for revolving said cutters on their individual and common axes, and means for moving the chuck and the cutter-head to and from each other.

101. In a gear-cutter, a series of rotary milling-cutters operatively mounted to correspond with the pins of a pin-gear, means for progressively presenting a blank held by said chuck to the successive action of said cutters, means for rotating the series of cutters and blank relatively to each other at the relative speeds of the members of the completed gearing, and means for moving the chuck and the cutter-head to and from each other.

102. In a gear-cutter, a circularly-arranged series of rotary milling-cutters, means for rotating said series on its axis, independent means for revolving said cutters, each on its own axis, at cutting speed, a rotary chuck, means for feeding a blank held by said chuck to the successive action of said cutters, means for rotating the blank and series of cutters at the relative speeds of the members of the completed gearing, and means for moving the chuck and the cutter-head to and from each other.

EDWARD G. ASHLEY.

Witnesses:
S. P. MOORE,
GERTRUDE C. BLACKALL.